(12) United States Patent
Blume et al.

(10) Patent No.: US 8,664,831 B2
(45) Date of Patent: Mar. 4, 2014

(54) ELECTROMECHANICAL MOTOR, ESPECIALLY A PIEZOELECTRIC MICROSTEPPER DRIVE

(75) Inventors: Heinrich-Jochen Blume, Darmstadt (DE); Bernhard Gottlieb, München (DE); Andreas Kappel, Brunnthal (DE); Robert Wolfgang Kissel, Egelsbach (DE); Karl-Heinz Mittenbühler, Griesheim (DE); Tim Schwebel, München (DE); Carsten Wallenhauer, Schwarzheide (DE)

(73) Assignee: Continental Automotive GmbH, Hannover (DE)

( * ) Notice: Subject to any disclaimer, the term of this patent is extended or adjusted under 35 U.S.C. 154(b) by 565 days.

(21) Appl. No.: 12/600,804

(22) PCT Filed: Apr. 23, 2008

(86) PCT No.: PCT/EP2008/054890
§ 371 (c)(1),
(2), (4) Date: Jun. 3, 2011

(87) PCT Pub. No.: WO2008/141883
PCT Pub. Date: Nov. 27, 2008

(65) Prior Publication Data
US 2011/0266920 A1 Nov. 3, 2011

(30) Foreign Application Priority Data
May 18, 2007 (DE) .......................... 10 2007 023 200

(51) Int. Cl.
*H02N 2/00* (2006.01)
*H01L 41/09* (2006.01)

(52) U.S. Cl.
USPC ................. 310/328; 310/323.01; 310/311

(58) Field of Classification Search
USPC .................. 310/311, 323.01–323.19, 328
See application file for complete search history.

(56) References Cited

U.S. PATENT DOCUMENTS

| 5,079,471 A | 1/1992 | Nygren |
| 6,664,710 B1 | 12/2003 | Gottlieb et al. |
| 2010/0295418 A1* | 11/2010 | Blume et al. ............. 310/323.02 |
| 2011/0260580 A1* | 10/2011 | Blume et al. ............. 310/323.02 |
| 2012/0146461 A1* | 6/2012 | Blume et al. ............. 310/323.16 |

FOREIGN PATENT DOCUMENTS

| DE | 37 21 682 A1 | 4/1988 |
| DE | 100 10 392 B4 | 11/2000 |
| DE | 103 22 836 A1 | 12/2004 |
| DE | 10 2005 024 317 A1 | 11/2006 |
| DE | 102005024317 | 11/2006 |
| DE | 10 2006 027 406 A1 | 12/2007 |
| DE | 102006027406 | 12/2007 |
| DE | 10 2006 044 000 A1 | 3/2008 |

(Continued)

Primary Examiner — Thomas Dougherty
(74) Attorney, Agent, or Firm — Cozen O'Connor (57) ABSTRACT

A motor which includes two drive elements, especially piezoelectric bending actuators, having effective directions that are perpendicular to each other. These actuators act upon a drive ring to thereby rotate a shaft. Diagonally opposite securing elements are provided on the drive ring and are used to flexibly suspend the drive ring via respective articulated corner elements on respective fixing elements that are diagonally opposite the respective securing elements. The drive according to the invention is compact, having actuators that are non-radially hinged to the drive ring.

17 Claims, 6 Drawing Sheets

(56) References Cited

FOREIGN PATENT DOCUMENTS

| | | |
|---|---|---|
| DE | 102006044000 | 3/2009 |
| EP | 1 098 429 A2 | 5/2001 |
| EP | 1098429 | 5/2001 |
| EP | 1 098 429 B1 | 10/2004 |

\* cited by examiner

ELECTROMECHANICAL MOTOR, ESPECIALLY A PIEZOELECTRIC MICROSTEPPER DRIVE

PRIORITY CLAIM

This is a U.S. national stage of application No. PCT/EP2008/054890, filed on Apr. 23, 2008, which claims Priority to the German Application No. 10 2007 023 200.6, filed: May 18, 2007, the contents of both being incorporated herein by reference.

BACKGROUND OF THE INVENTION

1. Field of the Invention

The present invention relates to an electromechanical motor, especially a piezoelectric actuating drive.

2. Prior Art

The cockpit of a motor vehicle attempts to achieve an optimum interplay of design and technology. Various pointer instruments are located within the field of view of the driver. These pointer instruments must both meet different technical requirements and have a competitive price for the mass production of motor vehicles. The "Messwerk 2000" by the company Siemens VDO is an example of such a pointer instrument.

The "Messwerk 2000" is based on a four-pole stepper motor drive geared down by means of a single-stage worm gear drive. The four-pole stepper motor is driven by two sinusoidal coil current signals, phase shifted with respect to one another by 90° in phase angle, as a function of time. The sign of the phase shift determines the direction of rotation and the frequency determines the speed of rotation of the motor shaft. Within one full period of 360° of the sinusoidal current variations, up to 128 intermediate stages can be set in a reproducible manner. The utilization of these intermediate stages is called microstepper operation.

A complete "Messwerk 2000" actuating drive containing the stepper motor characterized above consists of 12 single parts. The stepper motor itself is composed of two coils with a common stator plate and a permanent-magnet rotor. With regard to the component costs, the coils and permanent magnet account for most of the costs. Apart from the material costs, the production costs are also decisive for the price which increase approximately proportionally to the number of components of the actuating drive.

In EP 1 098 429 B1, an electromechanical motor operating without rotating coils, is known in which, during the operation, a drive ring is displaced whilst rotating by an operation, offset in time, of at least two electromechanical drive elements so that, by a direct transfer of force from the drive ring to the shaft, which, in particular, is located within the drive ring, the shaft is rotated. The rotating displacement movements of the drive ring can be produced by an actuator which, is driven piezoelectrically, magnetostrictively, electrostrictively or electrodynamically, so that an actuating drive which is better suited for mass production with regard to material costs and production costs is obtained. The piezoelectric actuators are attached to the drive ring in such a manner that their respective displacement acts radially on the drive ring in which context, if necessary, other measures are also taken to achieve an introduction of force on the drive ring which is as symmetric as possible.

Although the above technical circumstances result in a drive optimized with regard to function, having the best constant-velocity characteristics (constancy of rotational speed independently of the instantaneous position of the shaft) without torque fluctuations, the longitudinal extent and the radial arrangement of the bending actuators entail that the planar drive variants require considerable space in the plane and in most cases are not very compact. However, compact planar drives are urgently needed due to the very narrow installation space conditions given in cockpit instruments.

SUMMARY OF THE INVENTION

An object of the present invention consists in providing a stepper drive optimized with regard to the number of parts, production expenditure, requirement of installation space and functionality, especially a microactuating drive for movements of cockpit instruments. This object is achieved by an electromechanical motor, especially a piezoelectric microstepper motor.

The electromechanical stepper drive according to one embodiment of the invention includes the following features:

Two electromechanical, preferably piezoelectric, drive elements oractuators exhibit effective motion directions aligned approximately perpendicularly to one another, and a shaft supported rotatably in a drive ring in such a manner that the drive ring can be excited by a deflection of the piezoelectric drive elements into a respective effective direction to perform a displacement movement which can be transmitted directly to the shaft, in such a manner that the shaft rolls in the drive ring and as a result rotates. Furthermore, two securing elements, which are diagonally opposite with respect to the effective directions are provided on the drive ring by which the drive ring is flexibly suspended. Each receiving element is supported by one fixing element via an approximately rectangular angle element, the legs of which have toward their two ends, a hinge, wherein the four legs of the two angle elements complement one another around the drive ring to form an approximately rectangularly constructed frame aligned in parallel with the two effective directions, and are arranged such r that the respective securing element is linked by means of the respective angle element to a fixing element arranged diagonally opposite to it in the frame. In this arrangement, the angle elements in each case exhibit a corner element, the distance of which with respect to one another is kept constant by means of a mandatory measure so that the drive ring is suspended to be displaceable but not to be twistable.

The ring suspension according to the invention having two bent-away suspension elements (angle elements) which engage the drive ring diagonally oppositely and fix a respective securing element at a point diagonally opposite to it, the two angle elements being arranged in rotating-vane like manner with the same direction of rotation around the drive ring, has thus a (180°) rotational symmetry and realizes 'diagonal kinematics' due to the specific articulated linking of its elements or parts relative to one another. In contrast to the prior art, it is not necessary to consider radial forces introduced by the bending actuators into the drive ring with respect to the center point of the annular hole in this arrangement since the torque caused by the non-radial eccentric force introduction onto the drive ring—due to the measure relating to the distance of the corner elements of which a suppression of the degrees of torsional freedom of the flexible ring suspension is achieved—is absorbed essentially without torsion by the ring suspension. This opens up the possibility of a space-saving arrangement of the drive elements, especially along the inner and/or outer sides of the legs of the angle elements, that is to say, for example, in parallel with two sides, arranged at right angles, of a drive ring which is rectangular (toward the outside). This makes it possible to achieve a very compact installation-space-saving structure of the stepper drive. The stepper drive according to the invention is also characterized by a very low number of simple components so that it is especially suitable for mass production. Furthermore, a thermal detuning of the drive occurring due to different thermal expansion of plastic and actuator is constructionally reliably absorbed. Due to positive locking, e.g. by means of a toothing formed between drive ring and shaft, a very high actuating accuracy of the drive according to the invention is achieved in purely controlled operation without having to use sensors and a closed loop.

According to one embodiment of the invention—to optimise compactness—it is not attempted to achieve an absolutely completely symmetric application of force to the drive ring. The consequences possibly resulting from this with regard to the function, e.g. slight constant-velocity and torque fluctuations, can be reduced to such an extent that the customer's specifications are still adhered to. In particular, small torques can be compensated for by driving the drive elements by modulating the sinusoidal variation.

In a particularly advantageous embodiment of the invention, the measure for securing the torsional stiffness of the ring suspension is achieved by the fact that in parallel with the plane of the drive ring, at least one spacer constructed as a rod or a yoke is arranged, the ends of which are rigidly connected to the corner elements of the angle elements. Fixing the distance of the two corner elements of the angle elements by means of the spacer has the consequence that the ring suspension can easily (i.e. almost free from forces) shear relative to the two effective directions. In contrast, the ring suspension constructed in this manner with diagonal kinematics counteracts torsion with very high resistance.

In a constructionally simple and easily produced development of this embodiment, the corner elements exhibit at least on one side in each case one peg arranged perpendicularly to the plane of the drive ring and the spacer, the ends of which can be connected in each case by of a through hole to the respective peg of the respective corner element, exhibits a recess for contactlessly passing the shaft driven by the drive ring.

To implement the articulated nature of the diagonal ring suspension in a simple manner, the legs of the angle elements are linked to the securing element, the corner element and to the fixing element by respective one flexure hinge. The flexure hinges can be formed in each case by a tapering of the cross section of the legs of the angle elements in a short section which is of advantage especially in production.

With a view to the diagonal kinematics to be implemented, it is advantageous to secure the fixing elements in diagonally opposite corners of an approximately rectangular, mechanically stiff frame. In a development, the frame is constructed as a housing part of the stepper drive.

The two electromechanical drive elements can be constructed especially advantageously as bending actuators, preferably piezoelectric bending actuators.

Such solid-state bending actuators based on piezoelectric ceramic materials have been variously used in industry in different types of design for many years. They are distinguished by a small design, a low energy demand and high reliability. Thus, for example, a piezoelectric bending actuator has a service life of at least $10^9$ cycles in an industrial environment. The bending actuators used in a microactuating drive for, for example, pointer instruments are typically dimensioned in such a manner that they have a free deflection within a range of approx. 0.2 mm to 2 mm at their moving end. In addition, a blocking force within a range of from 0.5 N to 2 N is achieved in the case of a blockage of the deflection of the freely moving end of the bending actuator. The approximately straight-line deflection of the bending actuator is in each case transverse with respect to its greatest longitudinal extent. The direction of deflection corresponding to the effective direction of the bending actuator is thus approximately orthogonal to the longitudinal axis of the bending actuator.

A particularly compact variant of the stepper drive according to the invention is obtained by an arrangement in which the bending actuators are in each case hinged to the drive ring via a compression-tension rod arranged approximately in parallelwith the effective direction of the associated bending actuator and coupled to their moving end. The compression-tension rods in each case exhibit a flexure hinge toward each of their two ends. In this arrangement, in each case one bending actuator and the associated compression-tension rod are arranged at right angles along two sides or—in the case of a drive ring which is not rectangularly constructed—along two halves of the drive ring. This shear-flexible hinging of the two electromechanical, preferably piezoelectric, drive elements to the drive ring produces the advantage that their directions of movement are decoupled from one another so that the drive elements do not impede one another in their movement or only to a negligibly low extent. Thus, no energy losses occur during the application of force. In addition, the arrangement or hinging of the bending actuators in accordance with the present embodiment is greatly space-saving.

According to a development of the embodiments with bending actuators, it is advantageous to construct the drive ring, the angle elements and the fixing elements as a drive module fabricated in one piece in plastic injection-molding technique, the bending actuators also being injected into the drive module. Implementing the drive module in plastic injection-molding technique is simple and cost effective, including the bending actuators in the injection molding process reducing the number of production steps even further.

To support the drive module stiffly and to support the associated shaft rotatably, respectively, it is advantageous to provide an approximately cubic housing with a floor element and a lid, a central bearing block with a support surface and with a first bearing hole being provided in the floor element and a second bearing hole for the shaft being provided in the lid and the fixing elements being arranged in a housing corner and secured or integrated there in such a manner that the at least one cylindrical rolling area of the shaft can roll in an associated rolling area of an annular bore of the drive ring.

BRIEF DESCRIPTION OF THE DRAWINGS

The preferred embodiments of the present invention will be explained in greater detail with reference to the accompanying drawing, in which.

DETAILED DESCRIPTION OF THE DRAWINGS

Figure 2A:
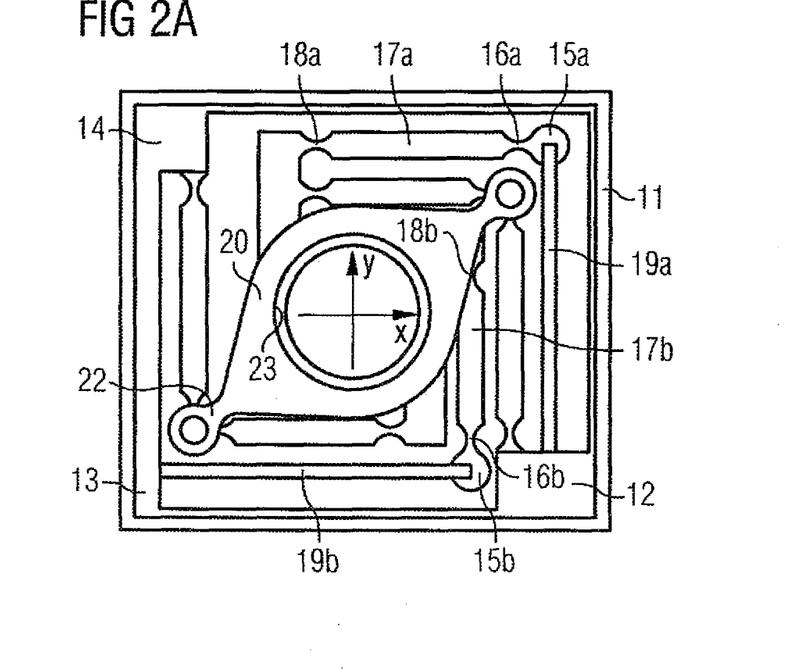
FIGS. 2A and 2B are, a drive module with inserted bending actuators and spacers in each case in the same views as FIG. 1.
Figure 2B:
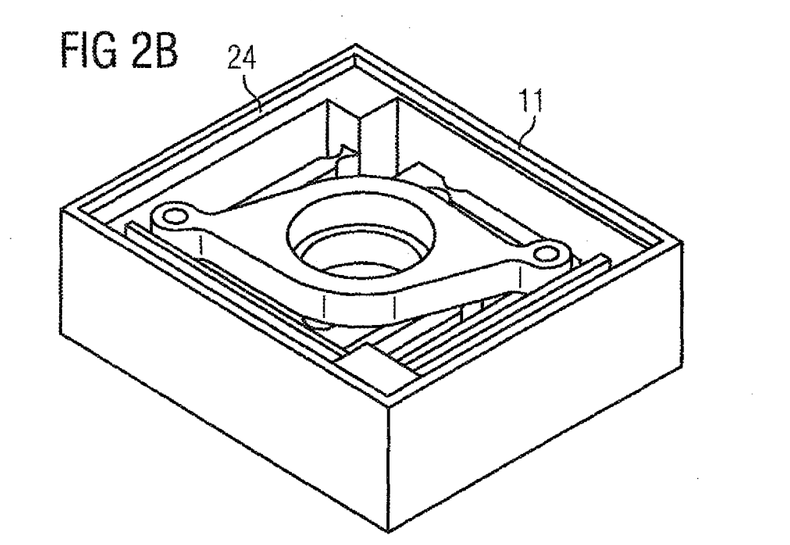

According to one embodiment of the invention, a piezoelectric stepper motor is presented which allows a continuous and uniform rotation to be generated by superimposing suitable periodic linear movements of the bending actuators. For this purpose, the bending actuators 19a, 19b, shown in FIGS. 2A and 2B, are coupled to a flat drive ring 1 by means of a ring suspension ensuring displaceability and shear-flexibility, respectively, in the x-y plane, in which the diagonal kinematics according to the invention are implemented, in such a manner that the drive ring can be translated along the mutually perpendicular effective directions x and y of the bending actuators 19a, 19b (shown in FIGS. 2A and 2B). The unit formed from the fixing elements 12, 14 (which can be integrated in the frame 11), together with the drive ring 1, the angle elements 36a, 36b, the compression-tension rods 17a, 17b and, if necessary, the integrated bending actuators 19a, 19b will be called a "drive module" in the text which follows. The drive module can be produced of polyethylene, injection-molded plastic, POM or of other suitable materials with the aid of an injection-molding technique.

Figure 1A:
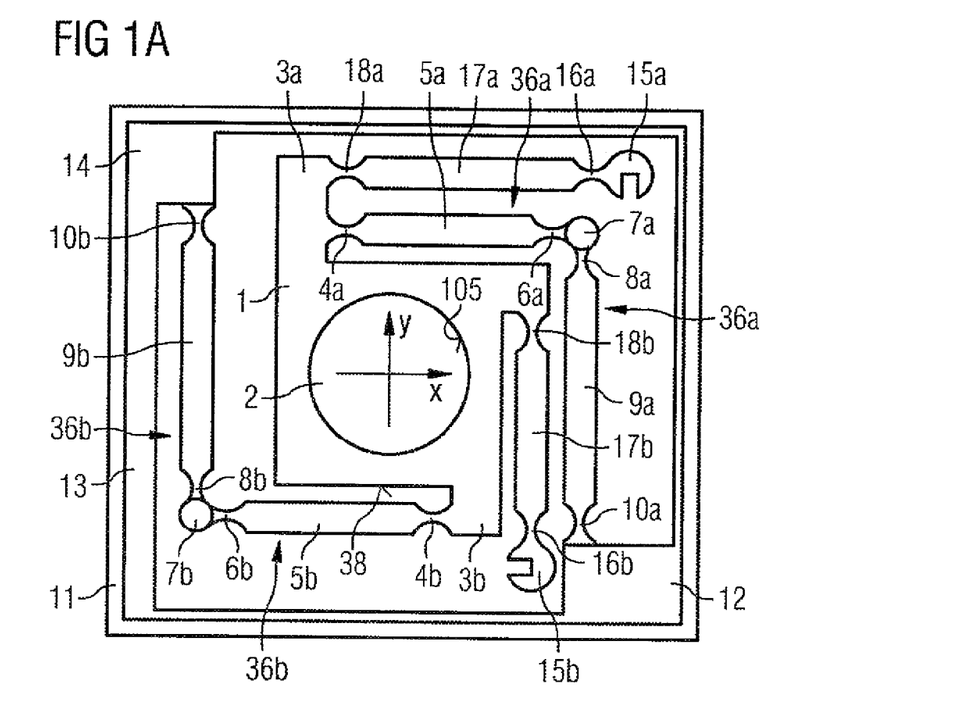
FIGS. 1A and 1B are an embodiment of a drive module, fixed in a housing frame, for the stepper drive according to one embodiment of the invention, in a top view and in a perspective view, respectively.
Figure 1B:
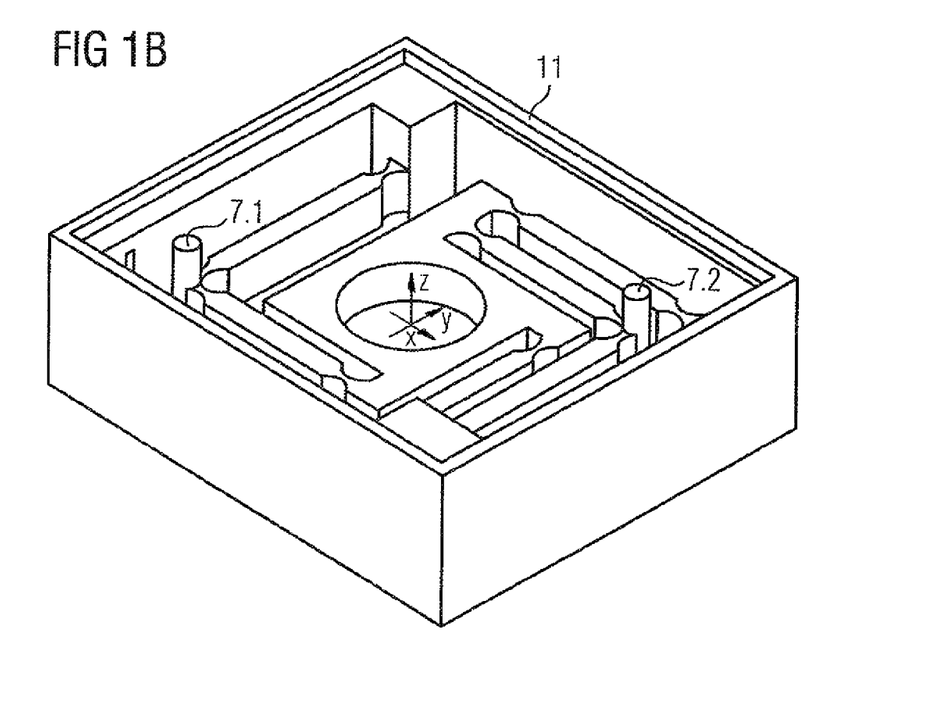

FIGS. 1A and 1B show the drive module in a top view (FIG. 1A) and in the perspective (FIG. 1B). Firstly, it consists of a drive ring 1 which contains a cylindrical annular bore 2, the axis of which, for example, coincides with the z axis of a Cartesian coordinate system, the x-y plane of which extends in parallel with the plane of the sheet. The drive ring 1 is constructed, for example, rectangularly and aligned with its (outer) edges or sides 38 in parallel with the two perpendicular effective movement directions of the drive elements 19a, 19b. At the drive ring 1, securing elements 3a, 3b are provided at diagonally opposite positions. By drive elements 19a, 19b, the drive ring 1 is flexibly suspended in a mechanically sufficiently stiff frame 11 via in each case a sequential arrangement of functional elements consisting of a flexure hinge 4a, 4b, a first leg (compression-tension rod) 5a, 5b, a flexure hinge 6a, 6b, a corner element 7a, 7b, a flexure hinge 8a, 8b, a second leg (compression-tension rod) 9a, 9b and a further flexure hinge 10a, 10b. In the text which follows, these two sequential arrangements are in each case also called angle element 36a and angle element 36b, respectively.

In this illustrative embodiment, the frame 11 forms a part of the drive housing at the same time and, if necessary, can have reinforcements 12, 13, 14 (e.g. in the corners and edges). The frame 11 can be used for securing the actuating drive, especially the fixing elements 12, 14 and is therefore assumed to be spatially fixed. The legs (compression-tension rods) 5a, 9a and 5b, 9b, respectively, are arranged approximately orthogonally to one another and approximately in parallel with the x axis (e.g. rods 5a, 5b) or the y axis (e.g. rods 9a, 9b), respectively, of the coordinate system defined above. The legs 5a, 5b, 9a, 9b are constructed to be mechanically sufficiently stiff with respect to the tensile/compressive forces occurring in operation and transverse forces (bending) so that they can be considered to be rigid bodies in a very good approximation. Due to the suitably constructed flexure hinges 4a, 4b, 6a, 6b, 8a, 8b, 10a, 10b, the ring suspension obtains its flexibility with respect to displacements of the ring in the x-y plane and torsion of the ring with respect to the z axis relative to the frame 11. Like normal hinges, flexure hinges provide for an almost unimpeded rotation of the connected elements relative to one another (but only within a limited angular range but free of play). Their operation is based on the bending principle. The local bending is achieved by a selective reduction of the rod cross section in a short section. The reduced rod cross section leads to a greatly reduced flexural stiffness. Since the cross-sectional tapering is greatly localized, the axial spring rate (stiffness) of the respective rod is scarcely reduced.

The ring suspension according to the invention has the following noteworthy characteristics and functions:

If the drive ring 1 is displaced, in the x direction by a distance dx relative to the frame 11 which is small compared with a typical rod length I, the rods 5a, 5b, and thus also the corner elements 7a, 7b, are also displaced in synchronism without their position changing relative to the drive ring 1 whereas the rods 9a, 9b are rotated slightly by the angle $\phi \approx dx/1 \ll 1$. Due to the smallness of the angle $\phi$, the y coordinates of the corner elements 7a, 7b remain unchanged in a very good approximation during the displacement. It follows from this that the distance of the corner elements 7a, 7b relative to one another does not change during the displacement in the x direction, or only to a negligibly small extent. An analogous observation applies to a displacement of the drive ring 1 in the y direction by a distance dy which is small compared with a typical rod length.

An important result is that level displacements of the drive ring 1 in the x-y plane leave the distance of the corner elements 7a, 7b unchanged. The slight rod rotations associated with the displacements are easily absorbed by the flexure hinges 4a, 4b, 6a, 6b, 8a, 8b, 10a, 10b.

If the drive ring 1 is rotated, e.g. clockwise by a small angle around the z axis, the x coordinates and the y coordinates of the securing elements 3a, 3b change in opposite directions relative to one another and relative to the frame 11. If the x and y coordinates of the securing element 3a change by the amounts dx and dy, caused by the rotation, the x and y coordinates of a securing element 3b located diagonally opposite at the same distance from the axis of rotation change by the amounts minus dx and dy, respectively, at the same time. The oppositely directed displacements of the securing elements 3a, 3b in the x direction relative to the frame 11 are absorbed by slight rotations of the rods 9a, 9b. The corner elements 7a, 7b also perform the oppositely directed displacement of the securing elements in the x direction since they are coupled rigidly to the ring 1 with respect to the x direction but slightly rotatably with regard to the frame 11.

The oppositely directed displacements of the securing elements 3a, 3b in the y direction relative to the frame 11 are absorbed by slight rotations of the rods 5a, 5b. The corner elements 7a, 7b do not also perform the oppositely directed y displacement of the securing elements 3a, 3b since they are coupled to the drive ring 1 slightly rotatably with respect to the y direction but rigidly to the frame 11 via the rods 9a, 9b.

A further important result is that rotations of the drive ring 1 with respect to the z axis change the distance of the corner elements 7a, 7b. The slight rod rotations associated with the ring rotations are easily absorbed by the flexure hinges 4a, 4b, 6a, 6b, 8a, 8b, 10a, 10b.

To form a ring suspension which provides in an unimpeded manner for displacements of the drive ring 1 in the x-y plane by distances which are small compared with a typical rod length but opposes a rotation of the ring 1 around the z axis with a very high resistance it is necessary to keep the distance of the corner elements 7a, 7b constant by means of a mandatory measure, e.g. a rod or yoke. To secure a suitable spacer, the corner elements 7a, 7b, as can be seen in FIG. 1b, are fitted with in each case one or two pegs 7.1, 7.2 above and below the plane of the drawing.

The structure of the ring suspension formed in this manner, which is here called diagonal kinematics, behaves in an extraordinarily torsionally stiff manner. As a consequence, according to one embodiment of the invention, it is no longer necessary to pay attention to the radial force application of the forces provided by the actuators (19a, 19b) into the drive ring 1 with respect to the center point of the annular bore 2 since the torque caused by a more or less eccentric non-radial force application to the drive ring 1 is absorbed torsionlessly by the diagonal kinematics described here and is diverted to the frame 11.

To link the drive elements in the form of strip-shaped solid-state bending actuators, suitably constructed receiving bodies 15a, 15b, which can be seen in FIG. 1A, are provided for their moving ends which are in each case secured on the drive ring 1 via a flexure hinge 16a, 16b, a compression-tension rod 17a, 17b and a further flexure hinge 18a, 18b. The deflections caused in the ring suspension move within a range of only approximately 100 micrometers.

FIGS. 2A and 2B show the drive module with inserted solid-state bending actuators 19a, 19b which, in the text which follows, will only be called actuator in brief, and two spacers 20. In the exemplary configuration shown, the actuators 19a, 19b are secured mechanically rigidly in the frame 11 at their resting end and arranged approximately orthogonally to one another. The stiffness of the linking of the actuators 19a, 19b to the frame 11 can be increased by reinforcements or fixing elements 12, 13 of the frame 11. In addition, measures, not shown here, for electrically contacting the actuators 19a, 19b at their resting end in the form of clamping or compression spring contacts etc. can be provided in the frame 11 and especially in the reinforcements 12, 13.

Instead, the actuators 19a, 19b can also be optionally electrically contacted in their moving sections or their moving end.

If an actuator 19a, 19b is electrically activated, it performs a bending movement, its moving end essentially performing a movement perpendicularly to its longitudinal extent. For this reason, the moving end of the actuator 19a essentially performs a movement in the x direction and the moving end of the actuator 19b essentially performs a movement in the y direction when electrically activated.

The direction of movement of the actuators 19a, 19b is also called effective motion direction.

The moving end of the actuators 19a, 19b is enclosed by the receiving bodies 15a, 15b and kept mechanically stiff and free of play so that the receiving body can absorb compressive and tensile forces or compressive and tensile movements generated by the actuator and transfer these via the flexure hinges 16a, 16b to the compression-tension rods 17a, 17b aligned approximately in parallel to the effective direction of the associated actuators, and from there via the connected flexure hinges 18a, 18b to the drive ring 1. The sequential arrangement of receiving body, flexure hinge, compression-tension rod which is aligned approximately in parallel to the respective effective direction of the actuator, flexure hinge and drive ring 1 offers the advantage that, as a result of the principle, it is only the force or deflection in the effective direction of the actuator which can be transferred between actuator and drive ring. For this reason, the two actuators 19a, 19b, arranged approximately orthogonally to one another, can act completely independently from one another on the drive ring 1 without influencing one another mutually. Thus, the actuator 19a, 19b, in particular, do not need to work against the comparatively high mechanical stiffness of the respective other bending actuator. The movements of the bending actuators 19a, 19b are thus decoupled.

If a bending actuator 19a, 19b is electrically activated, it bends approximately in the form of a circular arc as a result of which the slope of the tangent of the bending line at the moving end of the actuator changes. This type of "rotational movement" is reliably absorbed by the flexure hinges 16a, 16b, 18a, 18b. Similarly, a change in the actuator length relative to the drive module (e.g. due to different thermal expansion of the diagonal kinematics and of the actuator material) is reliably absorbed by the compression-tension rod coupling 17a, 17b with flexure hinges 16a, 16b, 18a, 18b in that the rods 17a, 17b are rotated minimally without this impairing their force or travel transfer function.

The torsional rigidity of the ring suspension is guaranteed by the spacer 20 which, e.g. by pressing suitably formed through holes 21 onto the pegs 7.1, 7.2 of the corner element 7a, 7b, is mechanically rigidly joined to these.

In summary, the bending actuators 19a and 19b move the drive ring 1 completely independently of one another in the x and y direction, respectively, relative to the fixing elements 12 and 14. Ring torsion is prevented by the diagonal kinematics.

The housing frame 11 of the drive module has at its top and underside peripheral edges 24 for positionally accurately inserting a lid (shown in FIG. 4B) and a floor as will still be described in greater detail further below.

Figure 3:
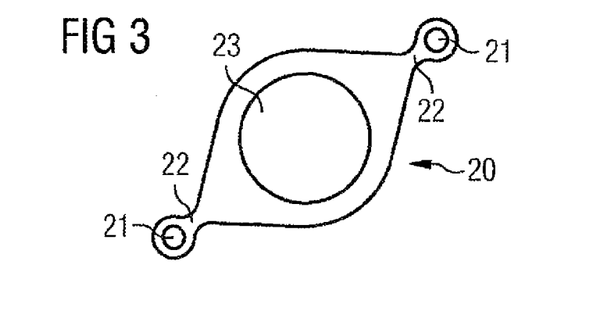
FIG. 3 is a top view of a spacer according to FIG. 2.

FIG. 3 is the spacer 20 with through holes 21 suitably fitted to the pegs 7.1, 7.2 of the corner elements 7a, 7b for a press fitting. The spacer 20 has a sufficiently high compressive-tensile stiffness between the force introduction points located in the axes of the through holes 21.

The spacer 20 can optionally contain flexure hinges 22 in order not to obstruct any possible slight rotation of the corner elements 7a, 7b. The recess 23 is used for contactless passage of the shaft.

Figure 4A:
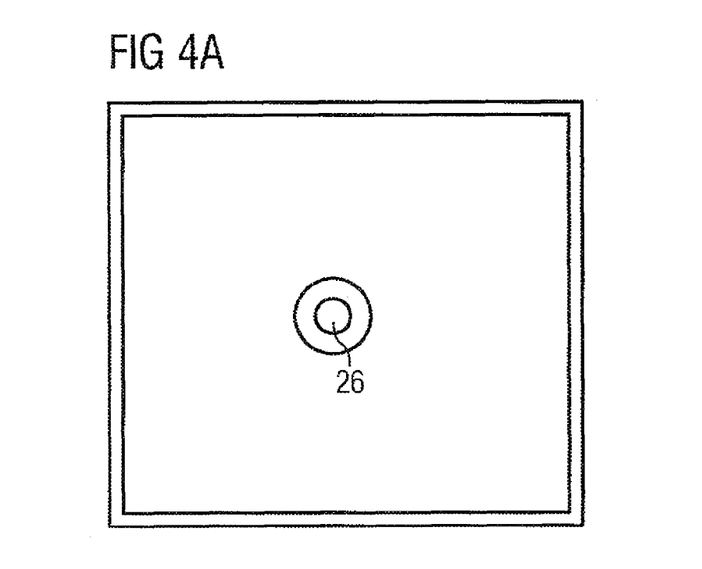
FIGS. 4A and 4B are, a housing floor element for supporting shaft and the drive module; in the same view as FIG. 1.
Figure 4B:
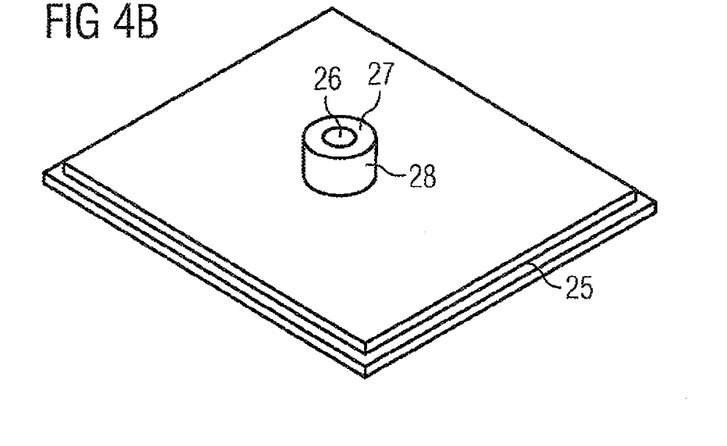

To implement the diagonal kinematics principle associated with the drive module in a stepper motor, a shaft and a support thereof which is as free of play as possible but rotatable, and a stiff support of the drive module are also required:

FIG. 4A a floor element suitable for use in conjunction with the housing frame 11. It contains a peripheral groove 23 paired with a peripheral edge 24 of the drive module, which, when the floor element is inserted into the drive module, ensures that the bore axis of a bearing bore 26 comes to lie congruently with the axis of the annular bore 2 of the ring 1. The diameter of the bearing bore 26 is paired with a cylindrical sliding surface for the shaft 39, see FIG. 9, which, together, form a first rotary bearing, which is substantially free of play and of low friction for the shaft 39. The front face 27 of the central bearing block 28 is used as support surface for the shaft 39 so that a rolling area of the shaft 39 comes to lie at the same height as the annular bore 2.

Figure 5A:
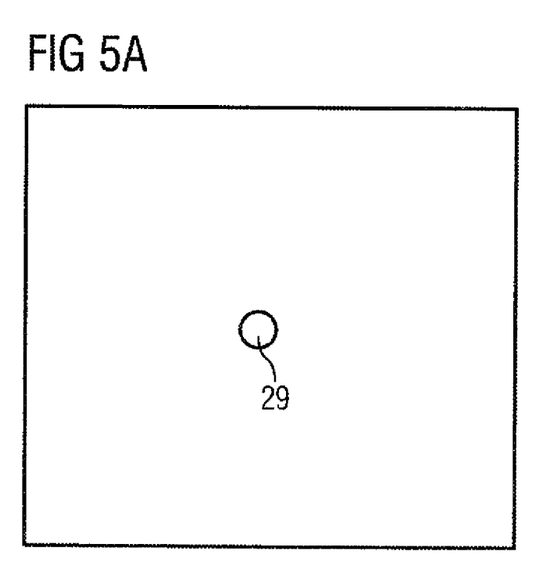
FIGS. 5A and 5B are, a lid fitting the housing according to FIG. 4; in the same view as FIG. 1.
Figure 5B:
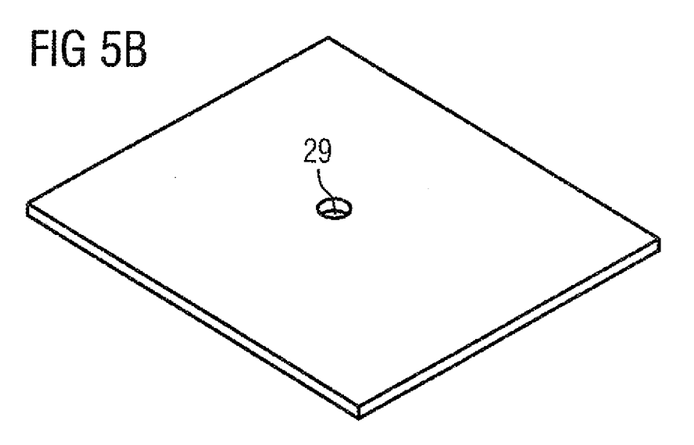

FIGS. 5A and 5B are the lid fitting the housing frame 11, which also has on its underside a peripheral groove which is paired with a peripheral edge 24 of the drive module so that, when the lid is inserted into the drive module, the axis of a bearing bore 29 comes to lie congruently with the axis of the annular bore 2. The diameter of the bearing bore 29 is paired with a second cylindrical sliding surface for the shaft 39 which, together, form a second rotary bearing, which is free of play but of low friction, for the shaft 39 shown in FIGS. 8A, 8B, and 9.

Figure 6A:
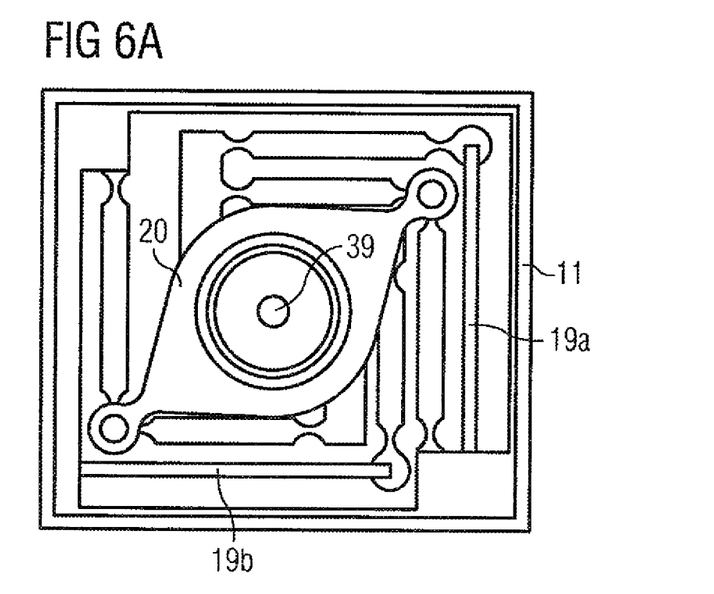
FIGS. 6A and 6B are, in the same view as FIG. 1, a partial assembly of the stepper drive according to the invention in its housing.
Figure 6B:
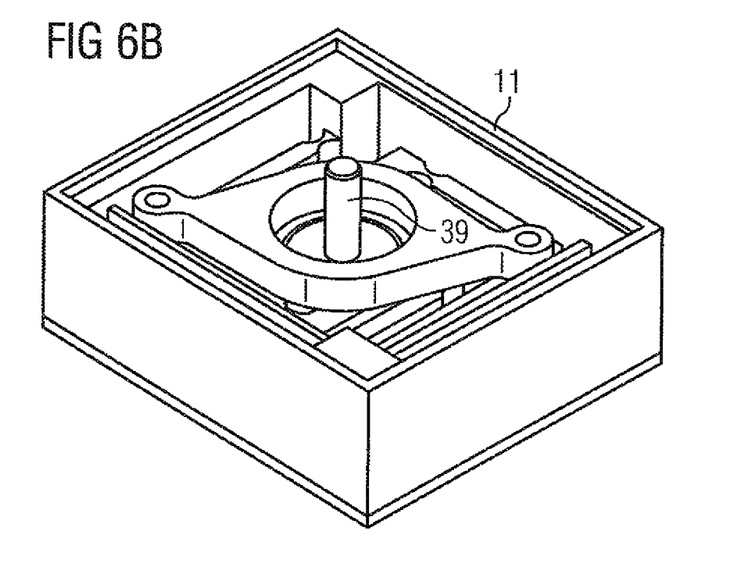

FIGS. 6A and 6B are partial assembly of the stepper drive according to one embodiment of the invention, with a floor element (FIGS. 4A, 4B) inserted into the housing frame 11, actuators 19a, 19b, spacers 20, and shaft 39.

Figure 7A:
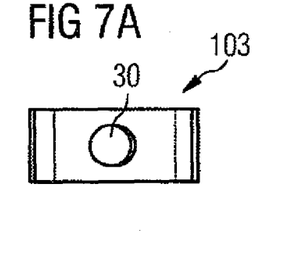
FIGS. 7A and 7B are, in the same view as FIG. 1, a view of a yoke spring.
Figure 7B:
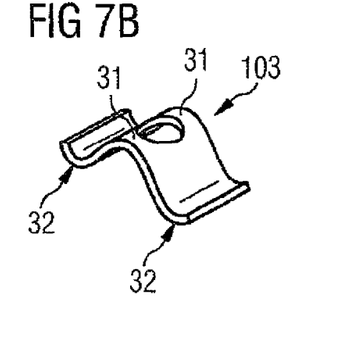

FIG. 7 shows a suitable yoke spring 103. It contains a hole 30 for passing the shaft 39, which ensures that it cannot 'migrate' in operation. The yoke spring 103 is supported on the shaft 39 via areas 31 close to the axis of the hole in the form of a contact line to keep any braking torque generated by friction on the shaft 39 as small as possible. The lower surfaces 32 located far outside are used for supporting the yoke spring 103 on a lid surface. The force of the yoke spring 103 is dimensioned adequately for keeping the shaft 39 reliably at rest on the front face 27 of the bearing block 28 of the floor element in all operating states, but is also kept as small as possible in order to prevent significant friction forces which would impede the rotation of the shaft 39. This ensures that the rolling areas of drive ring and shaft 39 remain localized with respect to one another sufficiently accurately in the z direction under all operating conditions.

Figure 8A:
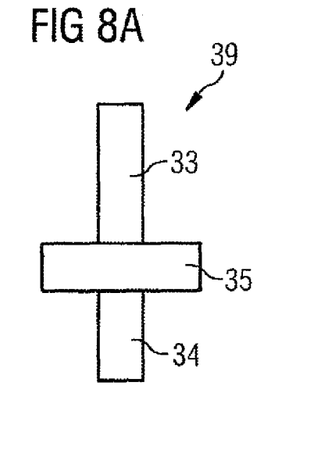
FIGS. 8A and 8B are, in each case in the same view as FIG. 1, a shaft for the stepper drive according to the invention.
Figure 8B:
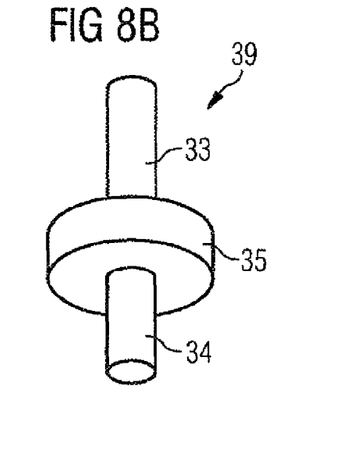

FIGS. 8A and 8B are a suitable shaft 39. It has two cylindrical sliding bearing surfaces 33, 34 which are paired with the cylindrical inner surfaces of the bearing bores 29, 26, and at least one cylindrical rolling area 35 which is paired with at least one rolling area 105 (FIGS. 1A and 1B) of the annular bore 2 of the drive ring 1. The axial extension of the surface 33 is used for connecting the respective element to be driven by the stepper motor to the shaft 39.

Figure 9:
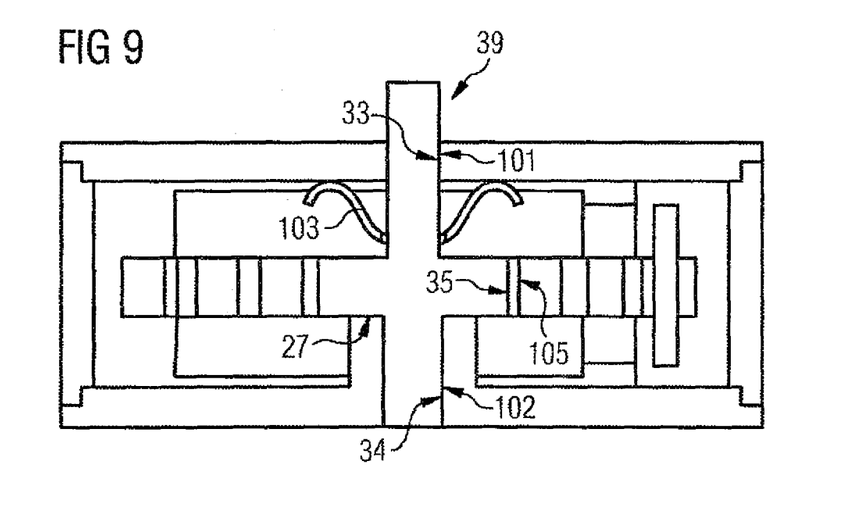
FIG. 9 is an axial cross section along the z axis through the drive in its housing in the assembled state.

FIG. 9 is an axial cross section along the z axis through the drive in the assembled state. In particular, it shows the position of its components with respect to one another. The shaft 39 can be rotated with low friction around the z axis at two places in the form of narrow clearances by means of the sliding-surface pairs 33, 101 and 34, 102 but is supported mechanically rigidly with respect to translation. A suitable yoke spring 103, in interaction with the support surface 27, keeps the shaft 39 fixed in a low-friction manner with respect to the z direction. In a state of rest, the drive module keeps the rolling area 105 of the annular bore 2 both concentrically and in the z direction in a suitable position relative to the rolling area 35 of the shaft 39.

With the aid of suitable electrical activating functions, the bending actuators 19a, 19b in each case perform at their moving end deflections with a sinusoidal or cosinusoidal variation in time around the rest position, as a result of which the rolling area 105 of the annular bore 2 is kept to rest against the rolling area 35 of the shaft 39 and is moved around the rolling area 35 of the shaft 39 in the form of a circular displacement movement and, as a result, rotates the shaft 39. The direction of rotation is established by means of the relative phase angle of the x and y deflections of the drive ring 1, respectively and the speed of rotation is established with the aid of the control frequency.

In the simplest case, force is transmitted from the drive ring 1 to the shaft 39 by friction. In this context, slippage can occur in dependence on the load torque acting on the shaft 39, of an actuating drive constructed in this manner, which reduces the accuracy of the actuating drive. The slippage is preferably reduced by the introduction of a positive fit between the rolling areas of drive ring 1 and shaft 39, especially by applying a toothing to the inner surface 105 of the drive ring 1 and to the outer surface 35 of the shaft 39. In this arrangement, the drive ring 1 and the shaft 39 preferably exhibit a tooth difference of at least 1. This means that the toothing of the inner surface 105 of the drive ring 1 comprises at least one tooth more than the outer surface 35 of the shaft 39. If drive ring 1 and shaft 39 are operated within the actuating drive in such a manner that the toothing does not drop out of engagement, the actuating drive ideally works free of slippage.

A cycloidal toothing of drive ring 1 and shaft 39 is considered to be especially preferred. In the case of the cycloidal toothing, almost one half of all teeth is engaged as a result of which a high torque can be transferred between drive ring 1 and shaft 39. The number of teeth located on the inner surface 105 of the drive ring 1 and the outer surface 35 of the shaft 39 initially establishes a gearing-down of the actuating drive which is typically within a range of 20:1 to 200:1. To set the actuating drive further by only one tooth, that is to say to rotate the shaft 39 by one tooth further by means of the drive ring 1, a complete period of the driving sinusoidal signal of the actuator drive must be preferably passed. Since it is necessary to pass through one cycle of the drive signal for advancing by one tooth, the actuating drive is distinguished by high accuracy and by a high repetition accuracy. In addition, the number of teeth and the utilization of one cycle of the drive signal per tooth makes it possible to achieve a high angular resolution of the actuating drive. In addition to this, it is possible to interpolate arbitrarily within one period of the drive signal in order to ensure a microstepper operation of the actuating drive. The actuating drive according to preferred designs thus supplies a high efficiency, high gearing-down, a high transferrable torque based on the toothing of drive ring 1 and shaft 39, freedom from slippage during the transmission of the torque, arbitrary interpolation of the angle of rotation within one tooth of the shaft 39 (microstepper operation), low drive torque fluctuations (ripple) and a low loading on tooth flanks for drive ring 1 and shaft 39 so that the wear is also reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electromechanical motor, comprising:
 two electromechanical drive elements exhibiting respective effective motion directions aligned approximately perpendicularly to one another;
 a drive ring having a rectangular perimeter and configured to be activated by a deflection of the two electromechanical drive elements to perform a displacement movement;
 a shaft rotatably supported in the drive ring, such that the displacement movement of the drive ring is transmitted to the and rotates the shaft in the drive ring;
 two securing elements arranged diagonally opposite each other on the drive ring configured to flexibly suspended the drive ring;
 two fixing element corresponding to the two securing elements;
 a first approximately rectangular angle element configured to couple a first of the two securing elements to a first of the two fixing elements, the first rectangular angle element comprising:
  a first leg coupled to the first securing element;
  a second leg coupled to the first fixing element, the second leg coupled to the first leg, a first corner element arranged between the first leg and the second leg;

a first hinge arranged between the first leg and the first securing element; and a second hinge arranged between the second leg coupled and the first fixing element; and a second approximately rectangular angle element configured to couple the other of the two securing elements to the other of the two fixing elements, the second rectangular angle element comprising:

a third leg coupled to the other securing element;

a fourth leg coupled to the other fixing element, the third leg coupled to the fourth leg, a second corner element arranged between the third leg and the forth leg;

a third hinge arranged between the third leg and the other securing element; and a fourth hinge arranged between the forth leg coupled and the other fixing element;

wherein the first, third, and fourth legs are configured to form an approximately rectangular frame such that the respective securing elements are linked by the respective angle element to the fixing element arranged diagonally opposite to it in the frame, and wherein a distance between the first and the second corner elements is kept constant, whereby the drive ring is displaceable but not twistable.

2. The electromechanical motor as claimed in claim 1, further comprising at least one spacer configured as one of a rod or yoke arranged in parallel with a plane of the drive ring, the spacer having opposing ends configured to rigidly connect to the first and second corner elements.

3. The electromechanical motor as claimed in claim 2, wherein the first and second corner elements each comprise at least one peg arranged perpendicularly to the plane of the drive ring, wherein the spacer is connected by respective through holes to the pegs of the corner elements, the spacer further comprising a recess configured for contactlessly passing the shaft driven by the drive ring.

4. The electromechanical motor as claimed in claim 1, wherein the legs of the angle elements are linked to the respective securing element, the respective corner element, and to the fixing element by respective flexure hinges.

5. The electromechanical motor as claimed in claim 4, wherein each of the flexure hinges is formed by a cross-sectional tapering in a short section of the legs of the angle elements.

6. The electromechanical motor as claimed in claim 1, wherein the fixing elements are secured in diagonally opposite corners of an approximately rectangular, mechanically stiff frame.

7. The electromechanical motor as claimed in claim 6, wherein the frame is constructed as a portion of a housing of the stepper drive.

8. The electromechanical motor as claimed in claim 1, wherein the two electromechanical drive elements are bending actuators.

9. The electromechanical motor as claimed in claim 8, wherein the bending actuators are respectively hinged to the drive ring via a compression-tension rod arranged approximately in parallel with the effective motion direction of its respective bending actuator, each of the respective compression-tension rods coupled to a respective moving end of the bending actuator, each of the compression-tension rods comprising a flexure hinge at each end, wherein each of the bending actuators and its respective compression-tension rod are arranged at right angles along two sides of the drive ring.

10. The electromechanical motor as claimed in claim 8, wherein the drive ring, the angle elements, and the fixing elements form a drive module fabricated in one piece in plastic injection-molding technique, the bending actuators also being injected into the drive module.

11. The electromechanical motor as claimed in claim 1, further comprising:

an approximately cubic housing comprising:

a floor element comprising a central bearing block a support surface at a longitudinal end of the central bearing block; and a first bearing bore for the shaft extending longitudinally through the central bearing block; and a lid comprising a second bearing bore for the shaft, wherein the fixing elements are arranged in a housing corner of the housing such that the at least one cylindrical rolling area of the shaft can roll in an associated rolling area of an annular bore of the drive ring.

12. The electromechanical motor as claimed in claim 11, wherein the shaft is constructed with a disk-shaped centerpiece, a first annular front face of the disk-shaped centerpiece is configured to rest on the bearing block, an outer surface area of which forms the cylindrical rolling area of the shaft.

13. The electromechanical motor as claimed in claim 12, further comprising a yoke spring configured to secure the shaft in the z direction, the yoke spring provided with a hole for the passage of the shaft, the yoke spring being supported on a second annular front face of the disk-shaped centerpiece of the shaft opposite the first annular front face of the disk-shaped centerpiece and on the lid such that the rotation of the shaft is not significantly impeded.

14. The electromechanical motor as claimed in claim 2, wherein, for the transmission of force to the inner area of the annular bore of the drive ring and to the associated rolling area of the shaft, a toothing is applied.

15. The electromechanical motor as claimed in claim 8, wherein the two electromechanical drive elements are electromechanical motor bending actuators.

16. The electromechanical motor as claimed in claim 14, wherein, the toothing is a cycloidal toothing.

17. The electromechanical motor of claim 1, wherein the electromechanical motor is a piezoelectric microstepper drive.

* * * * *